(12) United States Patent
Cherubini et al.

(10) Patent No.: US 10,579,281 B2
(45) Date of Patent: Mar. 3, 2020

(54) RULE-BASED TIERED STORAGE SYSTEM

(71) Applicant: INTERNATIONAL BUSINESS MACHINES CORPORATION, Armonk, NY (US)

(72) Inventors: Giovanni Cherubini, Rueschlikon (CH); Ilias Iliadis, Rueschlikon (CH); Jens Jelitto, Rueschlikon (CH); Vinodh Venkatesan, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 14/829,133

(22) Filed: Aug. 18, 2015

(65) Prior Publication Data

US 2016/0070492 A1    Mar. 10, 2016

(30) Foreign Application Priority Data

Aug. 28, 2014   (GB) .................................. 1415249.0

(51) Int. Cl.
| | |
|---|---|
| *G06F 3/06* | (2006.01) |
| *G06F 11/34* | (2006.01) |
| *G06F 11/00* | (2006.01) |
| *G06F 11/30* | (2006.01) |
| *G06F 16/00* | (2019.01) |
| *G06F 11/20* | (2006.01) |

(52) U.S. Cl.
CPC .......... *G06F 3/0619* (2013.01); *G06F 3/0665* (2013.01); *G06F 3/0685* (2013.01)

(58) Field of Classification Search
CPC ..... G06F 3/0619; G06F 3/0665; G06F 3/0685
See application file for complete search history.

(56) References Cited

U.S. PATENT DOCUMENTS

| | | | |
|---|---|---|---|
| 7,725,475 B1 * | 5/2010 | Alspector | ............... H04L 51/12 |
| | | | 707/758 |
| 8,019,706 B2 | 9/2011 | Madison, Jr. et al. | |
| 8,239,584 B1 * | 8/2012 | Rabe | ..................... G06F 3/0605 |
| | | | 710/8 |
| 8,433,848 B1 * | 4/2013 | Naamad | ............... G06F 3/0605 |
| | | | 711/114 |
| 8,578,096 B2 | 11/2013 | Malige et al. | |

(Continued)

FOREIGN PATENT DOCUMENTS

WO     2014189403 A1   11/2014

OTHER PUBLICATIONS

Slonim, Noam and Naftali Tishby, "Agglomerative Information Bottleneck," 1999, NIPS (Year: 1999).*

(Continued)

*Primary Examiner* — Mano Padmanabhan
*Assistant Examiner* — Andrew J Cheong
(74) *Attorney, Agent, or Firm* — Cantor Colburn LLP; Kevin Michael Jordan

(57) ABSTRACT

A method for storing a data segment in a storage tier of a storage unit comprising at least two storage tiers includes receiving the data segment to be stored including metadata; receiving metadata of data segments stored in the storage unit; and determining the storage tier to store the received data segment to and a protection level dependent on the metadata received and dependent on the metadata of the received data segment.

4 Claims, 4 Drawing Sheets

(56) References Cited

U.S. PATENT DOCUMENTS

| | | | |
|---|---|---|---|
| 8,880,801 B1* | 11/2014 | Robins | G06F 12/0246 |
| | | | 711/114 |
| 2003/0046270 A1 | 3/2003 | Leung et al. | |
| 2003/0088813 A1* | 5/2003 | McClellan | G06F 11/1096 |
| | | | 714/42 |
| 2006/0004820 A1 | 1/2006 | Claudatos et al. | |
| 2009/0070651 A1* | 3/2009 | Diggs | G06F 11/1068 |
| | | | 714/752 |
| 2009/0112789 A1* | 4/2009 | Oliveira | H04L 67/1095 |
| 2009/0112880 A1* | 4/2009 | Oliveira | G06F 17/30091 |
| 2009/0182957 A1 | 7/2009 | Yashiro | |
| 2011/0282830 A1 | 11/2011 | Malige et al. | |
| 2012/0110259 A1* | 5/2012 | Mills | G06F 13/00 |
| | | | 711/113 |
| 2013/0185256 A1 | 7/2013 | Alatorre et al. | |
| 2013/0238563 A1 | 9/2013 | Amarendran et al. | |
| 2013/0282982 A1 | 10/2013 | Hayashi | |
| 2014/0032861 A1 | 1/2014 | Islam | |
| 2014/0115579 A1* | 4/2014 | Kong | G06F 3/0605 |
| | | | 718/1 |
| 2014/0136927 A1* | 5/2014 | Li | G06F 11/1048 |
| | | | 714/768 |
| 2015/0269000 A1* | 9/2015 | Alexeev | G06F 3/0631 |
| | | | 718/104 |
| 2015/0293984 A1* | 10/2015 | Zolotusky, Jr. | H04L 67/1097 |
| | | | 707/634 |
| 2015/0381725 A1* | 12/2015 | Haapaoja | G06F 3/06 |
| | | | 709/213 |

OTHER PUBLICATIONS

Maximize Operational Efficiency for Oracle RAC Environments With EMC Symmetrix Fast VP Automated Tiering), White Paper, EMC Global Solutions, Feb. 2011, pp. 1-37.

F. Moore, "Tiered Storage Takes Center Stage," Horison Inc., Dec. 21, 2010, pp. 1-11.

P. Cudre-Mauroux, et al.,"Trajstore: An Adaptive Storage System for Very Large Trajectory Data Sets," MIT CSAIL, Mar. 1-6, 2010, pp. 1-12.

UKSearch Report; Application No. GB1415249.0; Patent Act 1977: Search Report under Section 17(5); dated Mar. 17, 2015, pp. 1-4.

W. Chen, et al.,"Optimizing an Oracle Database With Dell Compellent Automated Tiered Storage," Database Solutions Engineering Dell product Group, Oct. 2012, pp. 1-22.

List of IBM Patents or Patent Applictions Treated as Related; (Appendix P), Filed Feb. 18, 2016, 2 pages.

Giovanni Cherubini et al., U.S. Appl. No. 14/956,616 entitled "Storage System," filed with the U.S. Patent and Trademark Office on Dec. 2, 2015.

Giovanni Cherubini et al., U.S. Appl. No. 14/956,616 entitled "Storage System," filed with the U.S. Patent and Trademark Office on Dec. 10, 2015.

List of IBM Patents or Patent Applictions Treated as Related; (Appendix P), Filed Jan. 29, 2016, 2 pages.

* cited by examiner

RULE-BASED TIERED STORAGE SYSTEM

FOREIGN PRIORITY

This application claims priority to Great Britain Patent Application No. 1415249.0, filed Aug. 28, 2014, and all the benefits accruing therefrom under 35 U.S.C. § 119, the contents of which in its entirety are herein incorporated by reference.

BACKGROUND

The present invention relates to a method for storing a data segment in a storage tier of a storage unit comprising at least two storage tiers, a corresponding computer program product, a processing unit for storing a data segment in a storage tier of a storage unit comprising at least two storage tiers and a storage system.

Today's multi-tiered storage systems are especially suited for offering a trade-off between high performance and efficient low-cost long-term storage of data. However, very limited intelligence is usually available to determine without human intervention within which tier and with what protection level a certain data file should be stored. While today's approach may be adequate for most applications given the number and size of data files that need to be stored and retrieved, it appears that a new paradigm is needed to address the challenges posed by applications where a very large amount of data is to be stored and valuable information is to be reliably identified, stored, and accessed. Examples of so-called big data applications are emerging in various fields, including social networks, sensor networks, and huge archives of business, scientific and government records. One of the ultimate big data challenges, however, is represented by a Square Kilometer Array (SKA) telescope, expected to be completed in 2024, whose antennas will gather tens of exabytes of data and store petabytes of data every day. Another significant big data challenge arises in the healthcare industry, where personalized medicine and large-scale cohort studies may require storage of medical data for extended periods of time.

SUMMARY

In one aspect, a method for storing a data segment in a storage tier of a storage unit comprising at least two storage tiers includes receiving the data segment to be stored including metadata; receiving metadata of data segments stored in the storage unit; and determining the storage tier to store the received data segment to and a protection level dependent on the metadata received and dependent on the metadata of the received data segment.

In another aspect, a device includes a processing unit configured to determine a storage tier of a storage unit having at least two storage tiers and a protection level for a data segment received for storage, by: receiving the data segment to be stored including metadata; receiving metadata of data segments stored in the storage unit; and determining the storage tier to store the received data segment to and a protection level dependent on the metadata received and dependent on the metadata of the received data segment.

In another aspect, a nontransitory computer readable storage medium having computer readable instructions stored thereon that, when executed by a computer, implements a method for storing a data segment in a storage tier of a storage unit comprising at least two storage tiers. The method includes receiving the data segment to be stored including metadata; receiving metadata of data segments stored in the storage unit; and determining the storage tier to store the received data segment to and a protection level dependent on the metadata received and dependent on the metadata of the received data segment.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION

Figure 1:
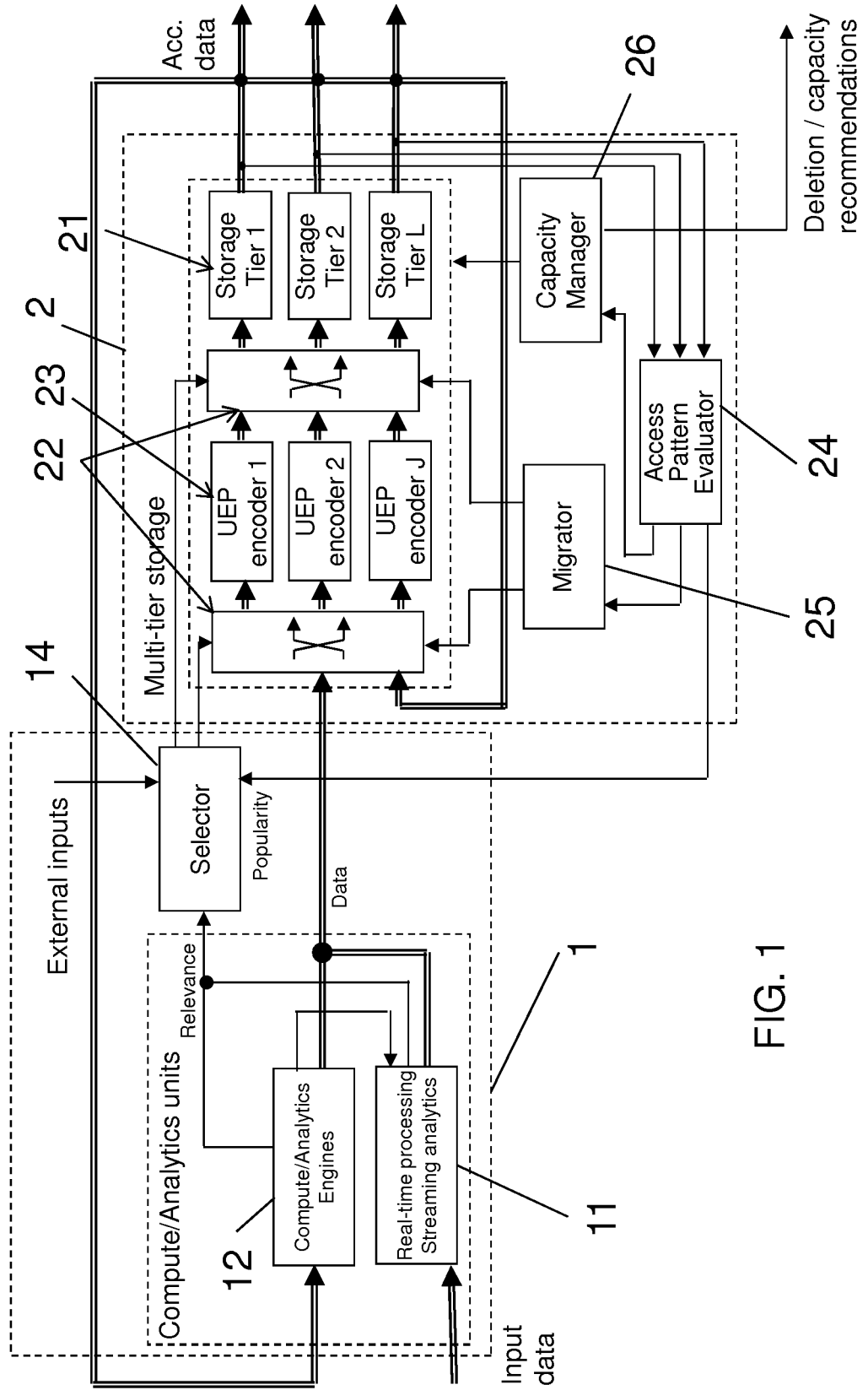
FIG. 1 is a block diagram of a storage system according to an embodiment of the present invention.

According to an embodiment of one aspect of the invention, a method is provided for storing a data segment in a storage tier of a storage unit comprising at least two storage tiers. The data segment to be stored including metadata is received. Metadata of data segments stored in the storage unit is also received. The storage tier to store the received data segment and a protection level to store the received data segment at are determined dependent on the received metadata of data segments stored in the storage unit and the metadata of the received data segment.

In embodiments, the method may comprise one or more of the following features: determining the storage tier and the protection level by identifying a storage tier and a protection level at which a majority of data segments that have the same or similar metadata as the received data segment are stored; a relevance class out of a set of at least two relevance classes is assigned to the received data segment; the storage tier is determined for the received data segment dependent on the relevance class assigned to the received data segment; determining information about a frequency at which data segments stored in one or more of the at least two storage tiers are accessed; determining the storage tier for storing the received data segment dependent on at least access frequency information received for data segments in the same relevance class; determining a level of protection for the classified data segment dependent on at least the relevance class assigned; storing the classified data segment including the assigned relevance class to the determined storage tier and according to the determined level of protection; the metadata of a data segment comprises a set of variables.

The set of variables includes one or more of: a user of the data segment, a size of the data segment, a time of generation of the data segment, an indication of whether structured or unstructured data are contained in the data segment, an access control list for the data segment, a time of last modification of the data segment, a time of last access of the data segment, a location of the data segment in a directory structure, a group to which a user of the data segment belongs, a name of the data segment, an indication of a required data retention time; determining an observable containing one or more variables of the set; determining for each value of the observable a distribution of stored data segments across the relevance classes of the set; assigning the relevance class to the received data segment dependent on the distribution determined for a value of the observable that is identified for the received data segment; determining the distribution of stored data segments across the relevance classes for each value of the observable includes determining a conditional probability for each relevance class of the set given a value of the observable; assigning the relevance class to the received data segment dependent on the conditional probabilities for the value of the observable identified in the received data segment; the relevance class assigned to the received data segment is the relevance class with the highest conditional probability given the value of the observable identified; adapting the observable over time into an adapted observable.

Receiving the data segment includes receiving the data segment from the storage unit; determining a storage tier and a protection level includes re-determining a storage tier for moving the stored data segment to and re-determining a protection level for storing the stored data segment at dependent on the adapted observable; defining a set of topics and assigning a topic of the set to each data segment received from the storage unit; determining for each topic and each value of the observable a joint probability for a data segment containing such topic and observable value; determining or adapting the observable according to the determined joint probabilities; redefining the set of topics over time thereby generating an adapted observable.

According to an embodiment of a further aspect of the present invention, a computer program product is provided comprising a computer readable medium having computer readable program code embodied therewith, the computer readable program code comprising computer readable program code configured to perform a method according to any one of the preceding embodiments.

According to an embodiment of a further aspect of the present invention, a processing unit is provided for determining a storage tier and a protection level of a storage unit comprising at least two storage tiers for a data segment received for storage, the processing unit being configured to execute a method as defined in any one of the preceding embodiments.

According to an embodiment of a further aspect of the present invention, a storage system is provided comprising a storage unit comprising at least two storage tiers, a processing unit according to any one of the preceding embodiments, and logic for storing the received data segment to the determined storage tier and at the determined protection level.

It is understood that method operations may be executed in a different order than listed in a method claim. Such different order shall also be included in the scope of such claim as is the order of operations as presently listed.

Embodiments described in relation to the aspect of an apparatus shall also be considered as embodiments disclosed in connection with any of the other categories such as the method, the computer program product, etc.

As an introduction to the following description, it is first pointed at general aspects of the invention.

Storage Tiers

A storage system is understood as a tiered storage system once it comprises multiple tiers of storage. Different storage tiers preferably are embodied as storage devices of different technology, including but not limited to tape storage technology, hard disk drive (HDD) storage technology, solid state drive (SDD) storage technology such as flash storage, etc. The storage devices may offer different characteristics per storage tier, that may for example include storage volume, reliability measured, e.g., in form of bit error rates, performance including access time, cost, term of storage, etc., such that when combining different storage technologies into a tiered storage system, considerable advantages can be achieved given that storage devices with different characteristics can be selected for storing data segments subject to the needs of the different data segments to be stored. Hence, it is preferred that in a multi-tiered storage system each storage tier comprises only one type of storage device. Note that in a different embodiment different tiers of a tiered storage may even be based on the same storage technology, which, however, may still show different characteristics owed to the usage of storage devices of different generations, of electrical connections of different quality, etc., such that these storage devices differ in at least one characteristic that may be relevant for storing data segments, and as such may impact the decision on which kind of storage device to place a data segment.

Generally, the different storage tiers may not necessarily reside at a common location or in a common housing but may be distributed as long as the classification unit to be introduced later on has access to the storage tiers and can store data segments to and retrieve data segments from the various storage tiers. Each storage tier as such may contain one or more physical devices. For example, an HDD storage tier may contain up to hundreds of HDDs, or in a different embodiment, only a single HDD.

Data Segments

Data segments shall include any unit of data to be stored and in case of a tiered storage system any unit of data that may be a subject of an individual decision as to where in the tiered storage it is desired to be stored. Data segments may include one or more of blocks, pages, segments, files, objects files, portions of a data stream, etc.

Processing Unit—Classification

A processing unit as used in the context of the present invention is configured to assign a data segment received for storage to a storage tier of the storage unit with a certain protection level. For doing so, it is preferred that the data segment to be stored is classified into a relevance class. In one embodiment, two or more relevance classes may be assigned to a data segment, although the description mostly refers to one relevance class being assigned. A set of relevance classes from which a relevance class is selected for assignment preferably comprises at least two relevance classes. Each relevance class may imply a certain relevance of the data segments being classified thereto, wherein some relevance classes may refer to data segments with a content considered more important than the content of data segments assigned to other relevance classes. However, in a preferred embodiment, a relevance class may in the first instance solely represent a description of the content of the subject data segment, such as in the example of data received from a telescope "planet of size x and color y". Here, the relevance class assigned can rather be regarded as a descriptor for the content of the subject data segment. A relevance of the content described by the descriptor may at least later be added, e.g., by ranking the descriptors in order of relevance for storage purposes. Hence, the assignment of a relevance class to a data segment may in one embodiment include a mapping of descriptors to relevance classes, and e.g., also include a mapping of multiple different descriptors to a common relevance class. Finally, it is desired that a classification is applied that at least to some extent assigns a metric to a data segment reflecting an importance of the content of the data segment for storage purposes.

The set of relevance classes available for tagging a data segment may be defined up-front and may be fixed and limited in size, or may change dynamically during operation of the storage system and/or during operation of a user application making use of the storage system. In one embodiment, self-learning algorithms are applied for changing and/or refining the set of relevance classes. For the overall storage system, it is envisaged that at least two relevance classes are provided and available for tagging the data segments. Subject to the complexity of the user application, hundreds of relevance classes may be available. In the case of a use of one or more event detectors, the corresponding subsets of relevance classes that are assignable for a particular event are defined up-front. A subset may at minimum contain one relevance class in case the event is sufficiently defined by such relevance class.

In one embodiment of the present invention, the classification of a data segment into a relevance class preferably is based on information comprised in the data segment to be classified; this information is also referred to as the content of the data segment. Hence, it is the content of the data segment that is evaluated for performing the classification. However, information comprised in other data segments— e.g., data segments that are linked in time or space to the data segment to be classified—may also be evaluated for assigning a relevance class to the data segment. The classification unit may take different embodiments. Subject to the complexity of information in the data segments and the number of data segments arriving for storage, it may be preferred, that an event detector is provided. Such an event detector may evaluate the data segments to be classified for an occurrence of one or more pre-defined events. An event detector may evaluate a data segment on its own, or multiple data segments in combination. In an example of data segments representing images supplied by a telescope, an event may be considered as the occurrence of an astronomical event such as the occurrence of a planet in the image. A classifier may then classify the event in more detail, such as in one or more of size, shape, color, etc. In this respect, the event detector may also be understood as a pre-classifier which limits the number of relevance classes available for this particular event down to a subset. The subsequent classifier then may only assign one or more relevance classes of this subset. Preferably, multiple event detectors are provided and specifically each event detector is configured to detect a specific event that is different from the events the other event detectors are configured to detect. This arrangement is preferred in case parallel processing is required for big data applications. In such an embodiment, the classifier may be responsible for further classifying the detected events. However, it is preferred that one classifier is assigned to each event detector such that the number of classifiers corresponds to the number of event detectors. Hence, the classification may also be parallelized. In yet another embodiment, multiple classifiers may be provided in combination with only a single event detector configured to detect different multiple events. In this case, the number of classifiers may correspond to the number of events that can be detected by the single event detector. In the case of a use of one or more event detectors, the corresponding subsets of relevance classes that are assignable for a particular event are defined up-front. A subset may at minimum contain one relevance class in case the event is sufficiently defined by such relevance class. In another embodiment, the two operation event detection and classification process may be replaced by a single classification operation in which the data segments, which are input to the storage system, are evaluated versus the complete set of relevance classes. In the exemplary astronomical application, rather than looking for an astronomical event first and then classifying this event in more detail, the classification may be applied without prior event detection. Either way may result in the very same assignment of relevance class/es, e.g., "planet of size x and color y". In a different embodiment, the classification unit may solely comprise an event detector which at the same time acts as a classifier specifically when one or more dedicated classes are assigned to an event a priori. In a different view, the event may be known a priori, and only event features are to be identified, in which case an event detector is not needed.

Alternatively, a data segment may be classified into a relevance class dependent on the relevance class into which other and specifically similar data segments were classified in the past. This can be achieved by comparing metadata of the data segment to be stored with that of other data segments already stored in the storage unit. Hence, a data segment containing metadata may preferably be assigned a storage tier and/or a relevance class that a majority of the data segments with the same or with similar metadata are stored at.

Hence according to an embodiment of the invention the storage tier to store a received data segment to and a protection level to store the received data segment at are determined dependent on the received metadata of data segments already stored in the storage unit as well as dependent on the metadata of the respective received data segment to be newly stored. According to an embodiment, receiving metadata of data segments stored in the storage unit comprises receiving data segments already stored in the storage unit including its metadata. In other words, receiving metadata of data segments stored in the storage unit may comprise receiving data segments already stored in the storage unit together with its corresponding metadata.

In a preferred embodiment, metadata and content of the data segment received are compared with that of other data segments already stored in the storage unit.

The metadata of a data segment may comprise a set of variables. The set may in one embodiment comprise one or more of the following variables: a user of the data segment; a size of the data segment, a time of generation of the data segment, an indication of whether structured or unstructured data are contained in the data segment, etc. Note that structured data generally refers to information with a high degree of organization, such that inclusion in a relational database is searchable by simple search operations, whereas unstructured data is essentially the opposite.

Preferably, an observable is determined containing one or more variables of the set. For example, an observable may be defined by a combination of the variables user of a data segment and its size, i.e., {user, size}. An observable may take a value defined by the individual values of the variables. For example, a data segment may show a value of the above observable {X1,X2} with X1 being a specific user out of a set of users that own data segments, and X2 indicating the size of the data segment, for example between 10 GB and 20 GB.

Hence, an observable may be considered as a characteristic of a data segment, which is of interest for storing purposes. The one or more observables may be defined during initialization of the storage system, and/or may evolve during operation of the storage system given that new users may request for storage space, the variables of interest may change, etc.

An observable is preferably used for classifying a data segment received. For each value of the observable, it is preferred that a distribution of stored data segments across the relevance classes available is determined. For example, data segments showing the observable value {X1, X2} are stored at 50% in a relevance class 2, at 25% in a relevance class 1, and at 25% in a relevance class 3. This distribution may indicate into which relevance class a data segment with the same observable value is preferably assigned.

Hence, in response to receiving a data segment its metadata may be evaluated, which may include determining a value for the observable. Then, a distribution of relevance classes is looked up for stored data segments showing the same or a similar observable value. Hence, the present embodiment makes use of metadata of already stored data segments for classifying either new data segments received for storage or data segments already stored that are received for re-classification. Subject to the implementation, in case the value of the observable of a new data segment received is not available yet, data segments showing similar metadata may be considered as sufficient for classification purposes.

Preferably, the distribution of stored data segments across the relevance classes of the set includes determining a conditional probability for each relevance class of the set given a value of the observable. Then, the relevance class is assigned to the received data segment dependent on the conditional probabilities for the observable value identified in the received data segment, and preferably the relevance class with the highest conditional probability given the observable value is assigned to the received data segment.

Therefore, metadata of stored data segments—and preferably only of a selection of stored data segments—are supplied to the processing unit for allowing to determine the above distributions or conditional probabilities, preferably in combination with the corresponding data segments, in form of a feedback loop from the storage unit.

The definition of the one or more observables may be defined, e.g., at the time of initializing the storage system. Hence, the one or more observables define the metadata of interest at this point in time. However, the metadata of interest may change over time such that it is preferred that the one or more observables are adapted over time into one or more adapted observables. Then, the classification makes use of the one or more adapted observables, which may result in different relevance classifications assigned to the data segments received over time.

In this context, it may be preferred that data segments that are already stored in the storage unit be re-evaluated as to the storage tier that fits best. Hence, stored data segments may be supplied from the storage unit to the processing unit and may undergo a reclassification into a new relevance class subject to the one or more adapted observables. These data segments may then be moved from their present storage tier into a new storage tier with a certain protection level.

In order to provide a link between the content of a data segment and the values of the observable/s, it is preferred to define a set of topics. A topic of the set is assigned to each data segment received from the storage unit. For each topic and each observable value, a joint probability is determined for a data segment containing such topic and such observable value. Whenever there is deemed a need for updating the set of topics, which may be topics of interest indicating a specific content of a data segment, new joint probabilities may be determined, which may lead to an adaptation of the observable/s according to the newly determined joint probabilities.

In the following, a preferred embodiment is introduced for implementing a comparison between the metadata of a data segment received and the metadata of the data segments stored in the storage unit, and finally for determining the storage tier in which a new data segment preferably is placed:

A processing known as agglomerative information bottleneck algorithm is used for assigning a relevance class to a data segment, and specifically for comparing metadata and content of such data segment with that of other data segments already stored in the storage system. Presently, a data segment may be considered a collection of files. For example, let n be the number of data segments already stored. Let X denote the following set:

$$X\text{:finite set of observables for each data segment.}$$

For example, if U={u1, u2, u3, u4, u5, u0} is the set of all file owners and S={0-10 KB, 10-100 KB; ..., 10-100 GB} is a set of file size bins, X could be U×S. Based on these observables it is desired to classify each data segment into one of several relevance classes. Now, let T denote the set of all relevance classes:

$$T\text{: finite set of relevance classes.} \quad (1)$$

A compressed representation T∈T of X∈X is desired. The mutual information, I(T;X), between T and X, given by $$I(X;T) = \sum_x \sum_t p(x,t) \log \frac{p(x,t)}{p(x)p(t)} = H(X) + H(T) - H(X,T) \quad (2)$$

is a measure of the compactness of the compressed representation T, with entropies H(X), H(T), and H(X,T). Low values of I(T; X) imply a more compact representation. For example, when T has only one value, then I(T; X)=0. On the other hand, when T=X, then I(T; X)=H(X) where H(X) denotes the entropy of X. Without any additional constraints, the most compact representation would be to put all data segments in one class, as this makes the mutual information equal to zero. Therefore, additional constraints are preferred that make the problem more meaningful. In rate distortion theory, a distortion measure d:X×T→$R^+_0$ is typically used to impose a constraint. However, the right choice for a distortion measure in a given context may not always be clear. To overcome this and other drawbacks of the rate distortion theory in many practical applications, Tishby et al proposed an alternative approach called the information bottleneck, see N. Tishby, F. C. Pereira, and W. Bialek: "The Information Bottleneck method", the 37th annual Allerton Conference on Communication, Control, and Computing, September 1999: pp. 368-377. In the information bottleneck method, a new random variable Y is introduced, which can take one of many values in a set Y of relevant topics:

$$Y\text{:finite set of relevant topics.} \quad (3)$$

For example, Y could be equal to P, where P={p1, p2, p0} is a set of projects with which the files are associated. The problem can now be formulated as one of finding a compressed representation T of X that preserves the information about Y with respect to the different topics. In other words, it is wished to minimize I(T; X) while preserving I(T; Y) above some minimal level. The first observation is that since T is a compressed representation of X, it should be conditionally independent of Y, i.e., the Markov chain T↔X↔Y. In particular, the following two relations hold:

$$p(t) = \sum p(x)p(t|x) \quad (4)$$

$$p(y|t) = \frac{1}{p(t)} \sum_x p(x, y)p(t|x) \quad (5)$$

Then, the functional F is introduced:

$$F[p(t|x)] = I(T;X) - \beta I(T;Y) \quad (6)$$

Minimizing the above functional for a given value of β yields a soft classification p(t|x) of data segments into relevance classes. As β→0, the focus is solely on compression, hence all data segments are in one class and I(T; X)=0. On the other hand, as β→∞, the focus is on preservation of information about the relevant topics, hence the trivial solution is T=X. However, there is no compression in this case as I(T; X) is maximized and becomes equal to H(X). It can be shown that the conditional distribution p(t|x) is a stationary point of F if and only if $$p(t|x) = \frac{p(t)}{Z(x,\beta)} e^{-\beta d(x,t)} \quad (7)$$

with $d(x,t) = D_{KL}[p(y|x) \| p(y|t)]$. Here, Z(x; β) is a normalization function and $D_{KL}$ is the Kullback Leibler (KL) divergence between two probability distributions p1(.) and p2(.). Note that (7) is only a formal solution since p(t) and p(y|t) depend on p(t|x) through (4) and (5). One way to solve for p(t|x) is to start with an initial p(t|x) and iteratively update p(t), p(y|t), and p(t|x) using (4), (5), and (7). However, different initializations can lead to different solutions which correspond to local stationary points of F.

An alternative method to solve for p(t|x) is the agglomerative information bottleneck algorithm, see "Agglomerative information bottleneck", N. Slonim and N. Tishby. Consider the equivalent problem of maximizing $$F_{max}[p(t|x)] = I(T;Y) - \beta^{-1} I(T;X) \quad (8)$$

It is started with the most fine-grained solution T=X, that is, each value of X is assigned to its own class in T. Then, the cardinality of T is iteratively reduced by merging two values $t_i$ and $t_j$ into a single value $\bar{t}$. A merger $\{t_i; t_j\} \to \bar{t}$ results in the following:

$$p(\bar{t}) = p(t_i) + p(t_j) \quad (10),$$

$$p(y|\bar{t}) = \pi_i p(y|t_i) + \pi_j p(y|t_j) \quad (11)$$

where $$\Pi = \{\pi_i, \pi_j\} = \left\{ \frac{p(t_i)}{p(\bar{t})}, \frac{p(t_j)}{p(\bar{t})} \right\} \quad (12)$$

At each iteration, the pair minimizes the merger cost, where the merger cost is defined as $$\Delta F_{max}(t_i, t_j) = F_{max}^{bef} - F_{max}^{aft} \quad (13)$$

Here $F^{bef}_{max}$ and $F^{aft}_{max}$ correspond to the values of $F_{max}$ before and after the merger $\{t_i; t_j\} \to \bar{t}$. It turns out that $\Delta L_{max}(t_i; t_j)$ can be calculated by examining only the probability distributions that involve $t_i$ and $t_j$ directly:

$$\Delta F_{max}(t_i, t_j) = p(\bar{t}) \bar{d}(t_i, t_j) \quad (14)$$

where $$\bar{d}(t_i, t_j) = JS_\Pi[p(y|t_i), p(y|t_j)] - \beta^{-1} JS_\Pi[p(x|t_i), p(x|t_j)] \quad (15)$$

Here, $JS_H$ is the Jensen-Shannon (JS) divergence between two probability distributions $p_1(x)$ and $p_2(x)$ defined as $$JS_\Pi[p_1(x); p_2(x)] = \pi_1 D_{KL}[p_1(x) \| \bar{p}(x)] + \pi_2 D_{KL}[p_2(x) \| \bar{p}(x)] \quad (16)$$

where $\Pi = \{\pi_1, \pi_2\}$, $0 < \pi_1$, $\pi_2 < 1$, $\pi_1 + \pi_2 = 1$, and $\bar{p}(x) = \pi_1 p_1(x) + \pi_2 p_2(x)$.

The classes are iteratively merged until only one class remains, i.e., until T degenerates into a single value. The resulting tree describes a range of clustering solutions with different number of classes.

The two different approaches of classifying data segments, i.e., the classification based on the content of the data segment, and the classification according to stored data segments having the same or similar metadata may be combined in one embodiment. For example, for new data segments to be stored, a relevance class may be assigned based on the information to be extracted from the data segment. Instead, data segments retrieved from the storage unit may be assigned relevance classes determined, e.g., by means of the metadata of the data segments or by an application processing the data segment.

The classification unit assigns one or more relevance classes to a data segment to be stored, which is considered to be equivalent to assigning the data segment to one or more relevance classes. Preferably, only one relevance class is assigned per data segment. It is preferred that all data segments requested to be stored are classified and labelled by at least one relevance class. However, there may be envisaged a pre-processing unit that pre-processes data segments arriving at the storage system. Such pre-processing may in one embodiment already lead to a selection of data segments to be stored out of all arriving data segments. In one embodiment, the pre-processing unit is a real-time data pre-processing unit for real-time processing of arriving data segments, also referred to as input data segments, e.g., in form of an input data stream, where the real-time data pre-processing unit supplies a sequence of data segments to be stored, which are subsequently classified. Specifically, such a pre-processing unit may apply one or more of filtering operations, suppression of spurious data segments, removing interference data segments, etc.

Under the assumption that the data segments are provided to the storage system as an input data stream, it is preferred that one or more buffers be provided in the classification unit in order to temporarily buffer the incoming and/or preprocessed data segments for providing sufficient time for conducting the classification and the determination of protection level and storage tier as will be explained later on. Hence, in one embodiment, a buffer is provided for buffering a data segment received for storage for at least a period of time required by the classification unit for assigning a relevance class to this data segment. In case the classification is implemented by multiple classifiers, one buffer may be provided per classifier, or a common buffer may be provided for more or all classifiers. In addition, or independent from the above buffer/s, another buffer preferably is provided for buffering a data segment received for storage for at least a period of time required by the selector for determining the storage tier and the protection level. After the determination, the selector may forward the data segment to be stored together with the class information and information as to the determined protection level and information as to the suggested storage tier to the storage unit, and in particular its logic.

Access Pattern Evaluator

In a preferred embodiment, an access pattern evaluator is configured to monitor accesses to the data segments stored in the storage unit, i.e., in at least one and preferably all of the various storage tiers. Accesses may in particular encompass read and/or write operations on a data segment, e.g., when a user of the storage system reads data segments from the tiered storage. The access pattern evaluator is configured to output such access patterns in form of access frequencies for the data segments. In a preferred embodiment, the access frequencies are not individually monitored and supplied, but access frequencies are provided with respect to relevance classes into which the stored data segments are classified as will be explained later on. The access pattern evaluator may be embodied in one of hardware, software or a combination thereof It is noted that the access pattern evaluator provides statistical data in form of an access frequency, for example. However, any other statistical data referring to accesses of stored data segments is meant to be subsumed under the term access frequency. The access pattern evaluator provides access frequencies for stored data segments, and as such evaluates a popularity of the data segments, as the access frequency may be regarded as a measure of the popularity of a data segment or the relevance class into which the data segment is classified. The higher the access frequency, the more popular the data segment or the corresponding relevance class is.

Processing Unit—Selector

Preferably, the storage system further comprises a selector. The selector may be implemented in hardware, software or a combination of both. For every data segment to decide on, the selector receives, possibly amongst others, the relevance class assigned to the data segment by the classification unit and preferably the access frequency information provided by the access pattern evaluator for data segments, and preferably for the particular relevance class to which the present data segment is assigned. Based on this information, i.e., the relevance class and the access frequency information for this relevance class, the selector determines a level of protection the data segment is to be stored with, and a storage tier in which the data segment is to be stored.

Hence, the selector takes its decision at least based on the relevance class as explained above. In a preferred embodiment, a data segment with a high-rank relevance class is associated with a high value. Accordingly, its content is such that a loss would be associated with a high cost. Therefore, this data segment deserves a higher level of protection compared to data segments with lower value.

In a preferred embodiment, protection of a data segment in the present context may be oriented along the following types of impairment categories that a data segment may incur:

(a) data corruption where bits are altered,
(b) data erasure where bits are lost, and
(c) temporary data unavailability.

The corresponding metrics for these types of impairments may include:

for type (a) impairments, a bit error rate metric;
for type (b) impairments, a mean time to data loss (MTTDL) metric or a mean annual amount of data lost (MAADL) metric;

for type (c) impairments, a percentage of time a data segment being unavailable.

These metrics again can be implemented by protection measures including one or more of the following:

for type (a) impairments, a required bit error rate metric can be achieved by applying an error correction code of a given correction power to the data segment;

for type (b) impairments, a mean time to data loss (MTTDL) metric or a mean annual amount of data lost (MAADL) metric can be achieved by applying an erasure code of a given correction power to the data segment;

for type (c) impairments, a percentage of time a data segment being unavailable can be limited by providing copies or replicas of the data segment in the storage unit, also referred to as applying a redundancy level.

multiple copies or replicas of the data segment in the storage unit provide protection measures for all types of impairments.

Hence, the protection level to be assigned may be selected from a set of protection levels available. In a preferred embodiment, each protection level is defined by a combination of individual impairment levels not to be underrun in the various impairment categories. The protection level then is achieved by a protection measure that addresses the one or more individually allowed impairment levels by corresponding one or more measures or a combination thereof, or by selecting a suitable redundancy level for the data segment; selecting a suitable error correction code for the data segment; selecting a suitable erasure code for the data segment. The determination of the redundancy level may in one embodiment specify the number of copies of the data segment to be stored in one or more of the storage tiers.

Through the monitoring of data segment accesses by the access pattern evaluator it can be determined which relevance classes or which corresponding data segments are more popular than others. Every time a data segment is accessed, the associated metadata information preferably including the relevance class is provided to the access pattern evaluator, which learns about a popularity of the information content in the data segments from the way they are being accessed. Access patterns may be found at various levels including one or more of activity during various times of a day, sequence of reads and writes, access sequentiality, or number of users retrieving the data. This information is used to preferably further classify data segments into one of several popularity classes and shall also be subsumed under the access frequency information.

Every time the access frequency information changes, e.g., the popularity class changes, such a change may be sent by the access pattern evaluator to the selector, which accordingly may update a metric for an initial decision on a level of protection and a storage tier of individual input data segments. Therefore, the selector determines the data segment placement in the tiered storage and the level of protection based on both a data relevance classification and data access statistics. In this manner, a data segment that belongs to a certain relevance class is passed out to a suitable storage tier and is protected by means at least achieving the required protection level, e.g., by one or more of applying an error correction code, an erasure code, and a redundancy level that are most appropriate at a particular point in time.

In an embodiment, the selector assigns a protection level and a storage tier placement to an incoming data segment $d_n$ at time $nT$, where $1/T$ is the rate at which data segments are received, based on metrics that depend on two variables, named "relevance index" $i_r(c_k)$, and "popularity index" $i_{p,n}(c_k)$, where $c_k$ indicates the relevance class such that $d_n \in$ $c_k$. Both $i_r(c_k)$ and $i_{p,n}(c_k)$ are real valued in the interval [0, 1]. Hence, it is apparent that classes are not necessarily restricted to discrete levels but also may be represented by real values as allowed. Note that the cardinality of the set of relevance classes is equal to $\aleph$, given by $\aleph = (K_1+1) \times (K_2+1) \times \ldots \times (K_N+1)$, where $K_l$ denotes the number of classes of the l-th classifier, l=1, 2, ..., N. The relevance index corresponds to the importance of the relevance class as identified by the N classifiers, whereas the popularity index corresponds to the popularity of the relevance class as determined by the access pattern evaluator. The popularity index of each class varies over time depending on the access pattern, whereas the relevance index varies slowly compared to the popularity index, as a result of a varying assessment of the relevance of a class. It is assumed that at each time interval a new data segment is received, sufficient capacity is available at each storage tier for a new data segment allocation. The relevance class of a new data segment at the n-th time interval, denoted by $d_n$, is assigned by a classifier, or by the classification unit as such, and the relevance index is given by $i_r(c_k)$, where $d_n \in c_k$. As the data segment $d_n$ is new to the system, its popularity class is ideally chosen as the most likely popularity class given that it belongs to relevance class $c_k$ or may be assigned manually by an administrator or user.

An estimate of the most likely popularity index for a data segment that belongs to a certain relevance class may be obtained by updating at each time interval the popularity index estimate for each relevance class as
$i_{p,n}(c_k) = \max(i_{p,n-1}(c_k) - \epsilon_0, 0)$, if no data segment of class $c_k$ is retrieved at the (n−1)-th time interval, or
$i_{p,n}(c_k) = \min(1, i_{p,n-1}(c_k) + \epsilon_1)$, otherwise,
where $\epsilon_0$ and $\epsilon_1$ are constant parameters.

In the absence of data access statistics, e.g., at initialization of a storage system, a correspondence between classes and storage tiers may be initially assumed, i.e., the higher the relevance class, the higher the protection level and the storage tier wherein a hierarchy of the storage tiers is applied according to a single one or a combination of characteristics of the different storage tiers. For example, a storage tier may be higher in the tier hierarchy if it provides faster access times, etc. However, some time after initialization of the storage system, additional information about the popularity of the data segments associated with a certain class is generated due to data retrieval activity and this may impact the selection of the protection level and the storage tier, e.g., the higher the popularity of a relevance class, the higher the storage tier to which a new data segment in this class is assigned. Again, the storage tier may be regarded as superior in the tier hierarchy if it provides faster access times, for example.

In a preferred embodiment, an assignment of a tier placement $T(d_n)$ follows:

$T(d_n) = f_t(i_r(c_k), i_{p,n}(c_k))$, and specifically $T(d_n) = f_t(\rho i_r(c_k) + \sigma i_{p,n}(c_k))$ (20)

and an assignment of a protection level $Q(d_n)$ follows:

$Q(d) = f_q(i_r(c_k), i_{p,n}(c_k))$ (21)

In a preferred embodiment, a redundancy level $U(d_n)$ is assigned to a data segment $d_n$ as follows:

$U(d_n) = f_u(Q(d_n), T(d_n))$ (22)

where $f_t$ and $f_q$ are functions that univocally map a metric value to a tier level and to a protection level, respectively, $\rho$ and $\sigma$ are given system parameters, and $f_u$ is a function that maps a tier and a protection level to a redundancy level. Hence, the determination of both a storage tier and a protection level for a data segment is preferably dependent on both the relevance index and the popularity index.

TABLE I

|  | Associated with | Determined by |
|---|---|---|
| Protection Level | Data segment | Relevance (or importance) of data segment |
| Reliability Level | Tier | Failure characteristics of the devices in the tier |
| Redundancy Level | Data segment | Protection level of the data segment and the reliability level of the tier(s) in which it is stored |

Table I illustrates the dependencies of the various levels. While in this embodiment the protection level is solely dependent on the relevance class, the redundancy level, as the sole or one of more protection measures for implementing the assigned protection level, is dependent on this very protection level assigned as well as on the determined storage tier. For quantifying the redundancy level, the selected storage tier is preferably represented by its reliability, which may be classified into a reliability level out of a set of reliability levels given that each type of storage device differs in particular in reliability, e.g., expressed by a bit-error rate. For example, the bit error rate of tape is currently in the order of 1e-19, whereas that of HDDs is in the order of 1e-15.

Preferably, it is assumed that any storage tier selection is inherently dependent not only on the parameters assigned to the data segment to be stored, but also on the specifics of the storage tier, which in one embodiment may be represented by the reliability level into which its bit error rate may be classified.

The above equations (20) and (21) preferably implement one or more of the following characteristics:

The more relevant (or important) a data segment is, e.g., expressed by its associated relevance index, the higher its assigned level of protection;

The more popular (or frequently accessed) a data segment is, e.g., expressed by its associated popularity index, the faster the access it requires, i.e., the faster the storage tier that is selected for storage.

The following Table II illustrates an assignment of a storage tier and a protection level to a data segment according to this embodiment of the present invention:

TABLE II

|  | Relevant data | Less important data |
|---|---|---|
| Popular data | High level of protection Faster tier | Low level of protection Faster tier |
| Infrequently accessed data | High level of protection Slower tier | Low level of protection Slower tier |

A protection level may be implemented by applying one or more of defined error correction code/s to the data segment, applying an erasure code across devices—such as RAID for HDDs—or storing the data segment a number of times in the same or in different tiers for providing redundancy. A combination of the means applied is also referred to as protection scheme or protection measure.

The following Table III illustrates an assignment of a storage tier and a protection level according to an embodiment of the present invention, wherein the protection level of a data segment is determined by the relevance class assigned, and wherein the storage tier is selected, e.g., dependent on the access frequency information for the subject relevance class. Hence, the less frequently the data segment is accessed the lower is the storage tier in which the data segment is stored. However, a lower storage tier may not only be slower in access time but also be less reliable. Or, the data segment may a priori be assigned to a less reliable storage tier in view of more preferred storage tiers already being occupied. Still, the requested protection level may still be achieved via determining a suitable redundancy level. According to Table III, relevant data segments that require a high level of protection may therefore be stored on a less reliable storage tier, however, in multiple copies in this storage tier thereby providing a high level of redundancy. Alternatively, the data segments requiring a high level of protection may be stored in a more reliable storage tier, however requiring only a moderate number of copies in this storage tier, i.e., a moderate level of redundancy. In a third alternative, multiple copies of such data segments may be stored across multiple tiers.

TABLE III

| | Relevant data | Less important data |
|---|---|---|
| Less reliable tier | High level of protection High level of redundancy | Low level of protection Moderate level of redundancy |
| More reliable tier | High level of protection Moderate level of redundancy | Low level of protection Low level of redundancy |
| Multiple tiers | High level of protection Multiple copies stored across tiers | Low level of protection Fewer copies stored across tiers |

After the various determinations, the selector may forward the data segment to be stored together with the relevance class information, the protection level information and information as to the suggested storage tier to the storage unit, and in particular its logic. In a preferred embodiment, the required protection measure is also already determined by the selector and submitted to the logic.

Logic

Logic is provided for storing the data segment in the determined storage tier and for implementing the determined level of protection. The protection level may therefore in one embodiment be translated into a protection measure including one or more of storing a number of copies, also referred to as redundancy level, selecting an error correction code, or selecting an erasure code. Alternatively, if the protection measures are already determined by the selector, the logic may apply these protection measures. The logic may be implemented in hardware, software or a combination of both and is meant to be the entity executing the suggestion taken by the selector.

Stored Data Segment

A data segment finally stored in the assigned storage tier is preferably stored together with the assigned relevance class and the assigned protection level. These levels may be stored in combination with other metadata for the specific data segment.

Storage Relocation Manager

According to a preferred embodiment of the storage system, however, also as an aspect independent from the previously introduced embodiments of the storage system and the corresponding storage unit, a storage relocation manager is introduced, as in a dynamic storage system the popularity of each data segment as well as its relevance—although to a lesser extent—may change over time. Hence, a unit referred to as storage relocation manager may be in charge for moving data segments to other storage tiers of the storage unit, also referred to as target storage tiers. For example, when the popularity of a data segment increases it may be desirable to move it from a present slow storage tier to a faster storage tier to enable quicker access. When the popularity of a data segment decreases it may be desirable to move it from a fast present storage tier to a slower storage tier to free up space for other popular data segments. However, any movement solely based on the popularity index may have impact on the protection level, too, e.g., when the target storage tier has a different reliability than the present storage tier. The same is true when a data segment is replicated across multiple tiers.

In a preferred embodiment, the storage relocation unit, which is also referred to as the migrator, receives information from an access pattern evaluator such as described above and as such receives access frequency information for the individual relevance classes. This access frequency information enables the migrator to place data segments in the right storage tier to enhance access performance. Specifically, the migrator may move data segments stored in a present storage tier to another storage tier if such movement is indicated by the present access patterns of such data segments, and specifically by the access patterns of the class in which the respective data segment belongs. In another embodiment, the migrator may in addition monitor a relevance class assigned to the data segment and specifically a change in such relevance class, which may also lead to a relocation of the data segment to a different storage tier and to a different protection level.

It may be desirable that more relevant and popular data segments deserve a higher level of protection. To ensure a certain protection level in a given storage tier, a protection scheme is employed which is understood as a combination of protection measures to implement the desired protection level. The protection scheme may entail a combination of error correction codes within devices—e.g., for type (a) impairments—, erasure codes across devices—e.g., for type (b) impairments—, and replication across devices—e.g., for type (c) impairments, as laid out above. However, when observing a different access frequency than in the past which may advise to move a data segment to a different storage tier, i.e., the target storage tier, the protection level in the target storage tier may be different than that of the present storage tier. If, on the other hand, the relevance of the data segment has not changed, the protection scheme preferably is to be amended. This is already because different storage tiers exhibit different levels of reliability, recall for example that the bit-error rate of tape is $1e^{-19}$ whereas that of HDDs is $1e^{-15}$. Consequently, when moving data segments from one storage tier to another, the migrator preferably adapts the applied protection scheme in order to maintain the same protection level, e.g., by one or more of changing between 2-way versus 3-way replication, applying error correction and/or erasure codes with different number of parities, etc.

For each data segment $d_l$, $l=1, \ldots, L$, stored in the storage unit, an access pattern evaluator such as the one described above preferably assigns a popularity class $c'_j$ and an associated popularity index $i_p(c'_j)$ which are determined by the number of accesses and the amounts of data read and written to each data segment in the recent history of time period $T_1$. The popularity class of each data segment is periodically sent by the access pattern evaluator to the migrator with time period $T_2$. The migrator then uses this information along with the relevance index $c_k$ of each segment to determine a target tier $T_n(d_l)$, the new protection level $Q_n(d_l)$, and the new redundancy level $U_n(d_l)$ for that data segment for the time period $nT_2$ to $(n+1)T_2$ using expressions similar to (20), (21), and (22), e.g.,:

$$T_n(d_l)=f_t(i_r(c_k),i_p(c'_j),C_1,\ldots,C_M,P_1,\ldots,P_M), \quad (23)$$

$$Q_n(d_l)=f_q(i_r(c_k),i_p(c'_j)), \quad (24)$$

$$U_n(d_l)=f_u(Q_n(d_l),T_n(d_l),R_1,\ldots,R_M), \quad (25)$$

wherein
$f_t$ and $f_q$ are functions, e.g., linear functions, that univocally map a metric value to a storage tier and to a protection level, respectively, and
$f_u$ is a function that maps a tier and a protection level to a redundancy level.

Here, $C_1, \ldots, C_M$ are the costs per gigabyte, $P_1, \ldots, P_M$ are the power consumption of a device, and $R_1, \ldots, R_M$ are the reliability indices which are metrics for the levels of reliability for each of the M tiers.

In one embodiment, for cost reduction, a certain protection level may be guaranteed by placing copies of data segments across multiple storage tiers. For example, a data segment with high relevance index and low to moderate popularity index may have one replica on an HDD storage tier for performance purposes, and another replica on a tape storage tier for reliability and cost purposes. It is known that erasure codes may provide much higher storage efficiency than replication for the same level of reliability. On the other hand, erasure codes may suffer from reduced access performance. Therefore, depending on the relevance and popularity indices, a choice may be made between an erasure code and replication based on the trade-off between storage efficiency and performance.

As described in connection with the selector, it is preferred that the Tables I, II and III also apply in the migration of already stored data segments, preferably in connection with the level of protection being specified for data segments in terms of certain metrics, e.g., MTTDL, availability, delay, etc., which can be associated with relevance classes and preferably popularity; in connection with the level of device reliability being specified in some metric (MTTF, . . . ) such as a failure or error characteristics of the storage devices/tiers, and in connection with the level of redundancy specifying parameters of an underlying redundancy scheme. The levels of protection for the data segments and the levels of device reliability for the device/s used within each tier are preferably known prior to a data segment replacement. The levels of redundancy are preferably determined such that the protection level for each data segment is guaranteed when the data segment is placed in a target tier.

The process introduced above is also referred to as dynamic tiering and may typically occur over large time scales compared to a time interval T over which a data segment is received for storage. The policies, according to which data is moved across different storage tiers and hence different types of storage devices, depend on access pattern characteristics and in addition preferably on the assigned relevance class. Depending on the storage device performance characteristics, certain tiering strategies may be better for a given workload than others. For instance, data segments accessed sequentially are preferably placed on HDDs, whereas randomly accessed data are preferably placed on SSDs. Also, it is conceivable that the updated information regarding the popularity of the data segments associated with the various relevance classes in one embodiment is used to determine subsequent data segment movements. This, in turn, can steer the employment of effective caching and tiering strategies that have a significant effect on the cost and performance of the storage system.

Storage Capacity Manager

According to a preferred embodiment of the storage system, however, also as an aspect independent from the previously introduced embodiments of the storage system and the corresponding storage unit, a storage capacity manager is introduced because of the finite capacity of the storage unit, and a foreseen large amount of data segments steadily created within a big data system, which will likely make it necessary to discard obsolete data segments and/or to judiciously increase the storage system capacity of the storage unit. The storage capacity manager preferably has the main functionality of avoiding a storage unit capacity overflow by suggesting deleting the least relevant data segments from the storage unit, and/or by reducing a redundancy of data segments, i.e., deleting one or more copies of one or more data segments, and in particular by deleting one or more copies of one or more data segments belonging to a certain relevance class, and/or by providing recommendations to a system administrator for a capacity extension of the storage unit. For instance, whenever the stored data segments approach an available capacity of the storage unit which may be considered as a criterion of a utilization of the storage unit being fulfilled for initiating action the fulfilling of which criterion is monitored by a monitoring unit, and in particular if new storage capacity cannot be made available, a capacity managing unit of the storage capacity manager may select one or more data segments stored in the storage unit and may suggest these data segments or copies thereof for removal, i.e., erasure from the storage unit, or delete the selected one or more data segments or copies thereof, or delete the selected one or more data segments or copies thereto after having suggested for deletion to a user or to an administrator and after having received a confirmation for doing so.

The storage capacity manager may act on an individual storage unit such as an HDD, a tape, or an SDD, and as such detached from the previously described multi-tiered storage unit. However, in case of the storage unit comprising multiple storage tiers, the storage capacity manager may act on each storage tier individually or on the storage unit as a whole. Hence, the utilization of the storage unit fulfilling a criterion such as falling below a capacity threshold and therefore indicating a shortage of storage capacity in the storage unit, may refer to an individual tier of the storage unit or to the overall storage unit. Hence, in one embodiment, it may suffice that the monitoring unit detects an individual storage tier falling short of free capacity and therefore triggering a selection process for finally suggesting and/or deleting selected data segments in this specific storage tier. In another embodiment, the criterion may be set such that the total capacity of the storage unit including the multiple storage tiers is compared to a capacity threshold and initiates the selection process. In yet another embodiment, the detection of the storage capacity of an individual storage tier falling below a capacity threshold may trigger a selection of data segments out of the entire storage unit not limited to the data segments stored in the storage tier that falls short in free capacity. It is noted that in the case of a tiered storage unit thresholds indicating a shortage of free capacity may be set different for different storage tiers.

The monitoring unit for monitoring the fulfillment of the criterion related to the storage capacity of the storage unit or of a part of the storage unit may be embodied as hardware or software or a combination of both. The utilization of the storage unit may in one embodiment be represented by the still available storage capacity of the respective unit or of an individual storage tier, or by the utilized, i.e., occupied and/or reserved storage capacity of the storage unit or by an individual storage tier. Preferably, the criterion indicates a shortage of still available storage capacity in the respective storage tier or unit. In another embodiment, the criterion may be a rate at which new data segments are stored in the storage tiers or in the storage unit as a whole.

The capacity managing unit may be embodied as hardware or software or a combination of both and be implemented together with the monitoring unit in a dedicated processing unit. The capacity managing unit preferably is configured to select one or more of the data segments or copies thereof that may be considered as more suitable for erasure than others. Accordingly, the selection is taken dependent on at least a relevance metric indicating the value of each data segment, i.e., the relevance classes introduced before. It is preferred that the data segments with the least relevance metric, i.e., the lowest relevance class indicating the lowest relevance of the corresponding data segment be suggested for erasure or at least for erasure of copies thereof. In one embodiment, the capacity managing unit takes a class-wise approach and, for example, suggests the data segments belonging to a common relevance class for erasure without differentiating between the data segments within such relevance class. In a different embodiment, however, the capacity managing unit takes an individual approach to data segments and may even differentiate between importance values of data segments with a common relevance class, e.g., by means of further evaluation of the content of the data segments, or by means of applying additional information available for the data segments.

The selection may be performed dependent on additional parameters, such as one or more of an access frequency to the subject data segments, an age of the data segments, a persistence metric assigned to the data segments, an obsolescence of data segments, etc.

In a preferred embodiment, the following metric is introduced for the storage capacity manager to determine which data segments are selected for further action, e.g., for deletion, suggestion for deletion, or a reduction or suggestion for reduction of redundancy.

$$R(d_l) = f_R(i_r(c_k), i'_p(c'_j), i_a(d_l), i_s(d_l))$$

or, in a more specific embodiment $$R(d_l) = f_R(\gamma i_r(c_k) + \delta i'_p(c'_j) + \eta i_a(d_l) + \kappa i_s(d_l)), \quad (26)$$

where $i_r(c_k)$ is a relevance class to which data segment $d_l$ belongs, i.e., $d_l \in c_k$, where the index l denotes the data segment number;

$i'_p(c'_j)$ is a popularity class $c'_j$ to which data segment $d_l$ belongs, i.e., $d_l \in c'_j$;

$i_a(d_l)$ is an age of the data segment $d_l$;

$i_s(d_l)$ is a persistence of a data segment $d_l$.

In general, the popularity class is different from the relevance class, and the popularity class and/or the relevance class of a data segment may vary with time. The popularity class may be defined as in connection with the storage system described above, and a determination of which may be supported by an access pattern evaluator such as described above. The relevance class may be determined by means of a classification unit such as described above, and may be stored as metadata together with the data segment in the storage unit. The age of the data segment may denote the age for which the data segment resides in the storage unit. The persistence of a data segment may in one embodiment be defined by a user or an administrator of the storage unit and specifically may take a value in the interval [0, 1], where persistence level 1 means "never delete", and 0 means "obsolete data".

In a preferred embodiment, the storage capacity manager applies the following rule:

If $R(d_l) < thr1$ then delete data segment $d_l$;

If $thr1 < R(d_l) < thr2$ then reduce a redundancy of data segment $d_l$; note that the term $\kappa i_s(d_l)$ alone must be able to be $>thr1$ to avoid unintended deletion;

If $thr2 < R(d_l)$ then keep data segment $d_l$ unmodified.

It is preferred that one or more copies of a data segments are suggested for removal first before removing the data segment as such, i.e., all copies thereof. Instead of or in addition to a suggestion or a removal of data segments or copies thereof, or in case the storage capacity manager determines that all existing data segments in the storage unit are still important, a recommendation may be made by the storage capacity manager to a user or an administrator as to expand the storage capacity of the storage unit or at least a tier of the storage unit in case of a multiple tier storage unit.

An automatic recommendation for a storage capacity expansion may be based on one or more of:

a computation of a capacity required to extend the present storage capacity by x %; or to serve storage requirements for the next y months, based on a historical capacity growth rate;

a determination of a storage device mix based on one or more of a storage unit needs, a current storage tier utilization, a historical capacity growth rate per storage tier, etc.

Advantages and Applications

A storage system as suggested in various embodiments addresses the content of the data segments to be stored and preferably classifies the data segments in real-time. Preferably, each data segment to be stored is associated with a relevance index reflecting the assigned relevance class and a popularity index reflecting the access frequency for data segments of the same relevance class in the data storage. Based on at least this two-fold information, the storage system allows a full automatic selection of an appropriate level of protection for each data segment, and a full automatic selection of a storage tier a certain data segment is to be initially stored to, all without human intervention.

A heterogeneous storage infrastructure, including e.g., solid-state drives, hard-disk drives, and tape systems, can efficiently be used. Performance, reliability, security, and storage efficiency at low operating cost and power consumption are achieved by evaluating the importance of the stored information for the purpose of, e.g., unequal data protection, intelligent tiering, and eventually erasure of obsolete data.

As explained in the previous sections, in embodiments of the storage system different levels of protection can be granted to data segments to be stored, depending on the relevance of the information contained. In one embodiment, it is assumed that data segments received for storage are classified by a classifier into one out of K+1 relevance classes, depending on their information content. Preferably, data segments with poor information content due to, e.g., calibration procedures or presence of interference, are assigned to Class 0, and preferably are discarded or stored at the lowest possible cost. Data segments in the remaining K classes are input to K different block encoders for error correcting codes. Each encoder may be characterized by parameters $n_i$ and $k_i$, where $k_i$ is the number of data symbols being encoded, and $n_i$ is the total number of code symbols in the encoded block. Specifically, a multi-tiered storage system with seven relevance classes is considered, where data segments are assigned to the various relevance classes according to a binomial distribution with parameter p. Again, the data segments assigned to Class 0 are assumed to be irrelevant. The data segments in Classes 1 to 6 are then encoded with a RS $(64,k_i)$ code from $GF(2^8)$, where $k_i$ goes from 60 to 40, i.e., the code length n is held at a constant value equal to 64, whereas the number of data symbols is given by $k_i=64-4i$, i.e., the number of data symbols decreases from $k_1=60$ to $k_6=40$. The redundancy thus increases from 4 symbols within a codeword for Class 1 to 24 symbols for Class 6. To assess a gain in storage efficiency that is obtained by the assumed storage system, consider an application where the data segments correspond to images with 100×100 pixels. Data segments might be assigned to Class 0 and discarded if collected, e.g., during calibration of experiments or in the presence of interference. For a random channel bit-error probability of $10^{-3}$, the six classes define sequences of images where in the average one pixel is in error every 1, $10^2$, $10^5$, $10^8$, $10^{11}$, $10^{14}$ images after retrieval, respectively. The efficiency gain obtained by the considered system with unequal error protection and binomial class probability distribution over a system that adopts RS encoding by a (64,40) code from $GF(2^8)$ for all data segments, is given in percent by $$g = \left( \frac{64}{40} \frac{1}{\sum_{k=1}^{6} \binom{6}{k} p^k (1-p)^{6-k} \frac{64}{64-k}} - 1 \right) \times 100$$

A storage system as introduced, which may also be referred to as cognitive data storage system, preferably is applied for big data applications. In such storage system, information may be efficiently extracted, stored, retrieved, and managed. Preferably, in a first operation, online detection and classification techniques are applied on incoming data segments. In this operation, the occurrence of events that are associated with valuable information are preferably detected and classified. Preferably, in a second operation, the result of the classification procedure together with information about the access patterns of similarly classified data is used to determine with which level of protection against errors, and within which tier of the storage system the incoming data segments are to be initially stored.

For instance, this cognitive approach could be useful for application in an existing telescope system (such as LOFAR) or in the future square kilometer array (SKA) telescope system. In particular, it may be applied to optimize future data access performance. Various workload characteristics may be evaluated for data placement optimization, such as sequentiality and frequency of subsequent data accesses. Based on this information, the appropriate tier for storing the data can be determined. Moreover, predictions regarding subsequent data accesses can enable effective caching and pre-fetching strategies.

In the specific embodiment of the square kilometer array (SKA), the functions of the classification unit may be performed by an enhanced version of a Science Data Processor (SDP). The SDP preferably has the task to automatically calibrate and image the incoming data, from which science oriented generic catalogues can be automatically formed prior to the archiving of images that are represented by the incoming data segments. Note that an event detector/classifier pair in the classification unit may face the challenging task of determining in real time a set of features related to a detected event, for example real time detection and machine-learned classification of variable stars from time-series data. In this case, the detection of variable stars using the least squares fitting of sinusoids with a floating mean and over a range of test frequencies, followed by tree-based classification of the detected stars may in one embodiment be well suited for online implementation. Within the current SKA architecture, the functions of a Multi-Tier Storage (MTS) system preferably are performed by an enhanced version of a Science Data Archive Facility.

For applications within the healthcare industry, the functions of the classification unit preferably depend on the context of the data being stored. For example, if data segments being collected are used for a cohort study, the parts that are relevant to the study may be classified as more important than other data. In the context of personalized medicine, medical records may be identified by their type, e.g., biochemistry, hematology, genomics, hospital records. Within each type, relevant features may be classified and associated with a certain level of importance.

FIG. 1 shows a block diagram of a storage system according to an embodiment of the present invention. The storage system comprises two main subsystems, i.e., a processing unit 1, and a storage unit 2 also referred to as Multi-Tier Storage (MTS).

The processing unit 1 comprises a classification unit 11, referred to as "Real-time processing Streaming analytics" in the block diagram, an analytics engine 12, and a selector 14. Data paths are referred to by a double line arrow, while control paths are referred to by a single line arrow.

The processing unit 1 receives input data in form of data segments that are desired to be stored in the storage unit 2. In addition, data segments stored in the storage unit 2 are received by the processing unit 1. In the classification unit 11, the data segments received are classified into one out of a set of relevance classes. Stored data segments instead may be re-evaluated and possibly be re-classified into a new relevance class by the analytics engine 12. Classified and re-classified data segments together with the relevance class assigned are forwarded to the storage unit for storing purposes.

In the analytics engine 12, metadata of received stored data segments are evaluated. For example, an observable is defined within the metadata available, and a relevance class distribution is determined for all values of the observable. By means of this information, a stored data segment that is supplied to the analytics engine 12 may be re-classified. Such data segment is evaluated as to its metadata, and specifically as to a value of the observable in the metadata. When the value of the observable is identified for the data segment, a distribution statistics is looked up for such observable value. This statistics may indicate the relevance class assigned to data segments showing such observable value, e.g., according to a conditional probability determined in the analytics engine 12 for such observable value. For example, as a result a relevance class may be assigned to the data segment that represents the relevance class with the highest probability in the distribution for this observable value.

The information as to the distribution of relevance classes over observable values may also be forwarded to the classification unit 11 if needed there. In one embodiment, the new data segments to be classified in the classification unit 11 may also be classified according to the metadata evaluation. In a different embodiment, the data segments to be stored in the storage unit 2 for the first time may be classified according to their content, e.g., according to the embodiment shown in FIG. 4.

In either variant, the relevance and the popularity information are supplied to the selector 14, which has the task of determining with which level of protection and to which storage tier the respective data segment is to be stored. This decision may depend on the relevance class information and preferably on the popularity for this relevance class, which is obtained from an access pattern evaluator 24 assigned to the storage unit 2.

The storage unit 2 receives the processed sequence of incoming data segments from the classification unit 1 to be stored in a multi-tier storage 21 containing L storage tiers, together with the determined relevance class, popularity, and possibly other features. This information preferably is utilized to assign a protection level for the respective data segment and an initial placement in one of the available storage tiers 21. An L-tier storage system with J data segment protection levels, with L=3 and J=3, is illustrated for example in FIG. 1. The three storage tiers 21 might correspond to different types of storage media, e.g., SSDs, HDDs, and tape. For performance optimization during normal system operation, frequently accessed data or randomly accessed data may preferably be placed on SSDs, whereas less frequently accessed data or sequentially accessed data may be stored on HDDs or on tape.

Prior to being stored on the physical media corresponding to the selected storage tier 21, each data segment is presented to an encoder 23, which provides different levels of protection, for example using unequal error protection (UEP), depending on the relevance class information. In an embodiment, compression and/or deduplication of the data segments may be considered in addition to UEP. A data segment with a high relevance class preferably is associated with a high value. Its information content is such that a loss would be associated with a high cost, and therefore the data segment is protected with a higher level of redundancy. The required level of redundancy may be provided by error correction coding or erasure coding, by storing replicas of the data segments, or by a combination of these techniques. Note that compression and/or deduplication of the data segments may be considered in addition to UEP.

The access pattern evaluator 24 of the storage unit 2 provides additional information about the popularity of the data segments associated with a certain relevance class. Every time a data segment is accessed in the storage unit 2, the associated metadata information including the class information is provided to the access pattern evaluator, which learns about the popularity of the information content in the data segments from the way they are being accessed. Access patterns may be found at various levels, e.g., activity during various times of a day, sequence of reads and writes, access sequentiality, and number of users retrieving the data. This information is used to further classify data segments into one of several popularity classes.

Subsequently, the access pattern evaluator 24 sends information to the selector 14 in the processing unit 1, which accordingly updates a metric for initial decision on level of protection and storage tier of individual data segments. Therefore, the selector 14 updates the criterion for initial data placement based on both data relevance classification and data popularity. In this manner, a data segment that belongs to a certain relevance class is passed out to the storage medium and is protected against errors with a redundancy level that are most appropriate at a particular point in time. Following an initial data placement, the access pattern evaluator 24 monitors all data segments in the storage tiers 21 and places each in the appropriate popularity class.

In the present embodiment of FIG. 1, a migrator 25 is provided, also referred to as storage relocation manager, which is preferably arranged in the storage unit 2. The migrator 25 receives information from the access pattern evaluator 24, and as such receives access frequencies to the individual classes. This information enables the migrator 25 to place data segments in the right storage tier 21 to enhance access performance. Specifically, the migrator 25 has the task of moving data segments stored in one storage tier 21 to another storage tier 21 if such movement is indicated by the present access patterns to such data segments, and specifically by the access patterns of the class to which the respective data segment belongs, adjusting the protection level of the data. This classification enables the migrator 25 to place the stored data segments in the right storage tier to enhance access performance.

In the present embodiment of FIG. 1, storage efficiency and access performance are further optimized by continuously monitoring the access patterns and updating the criteria for data segment placement in a storage capacity manager 26. When the amount of data segments stored in the storage unit system approaches a system capacity, an automatic selection of data segments for deletion or deletion of copies thereof is provided by the storage capacity manager 26. The selected data segments and/or copies thereof may be deleted and/or may be suggested for deletion and/or a system capacity expansion is requested, all preferably based on the importance and the access patterns of the data segments stored in the system.

Figure 2:
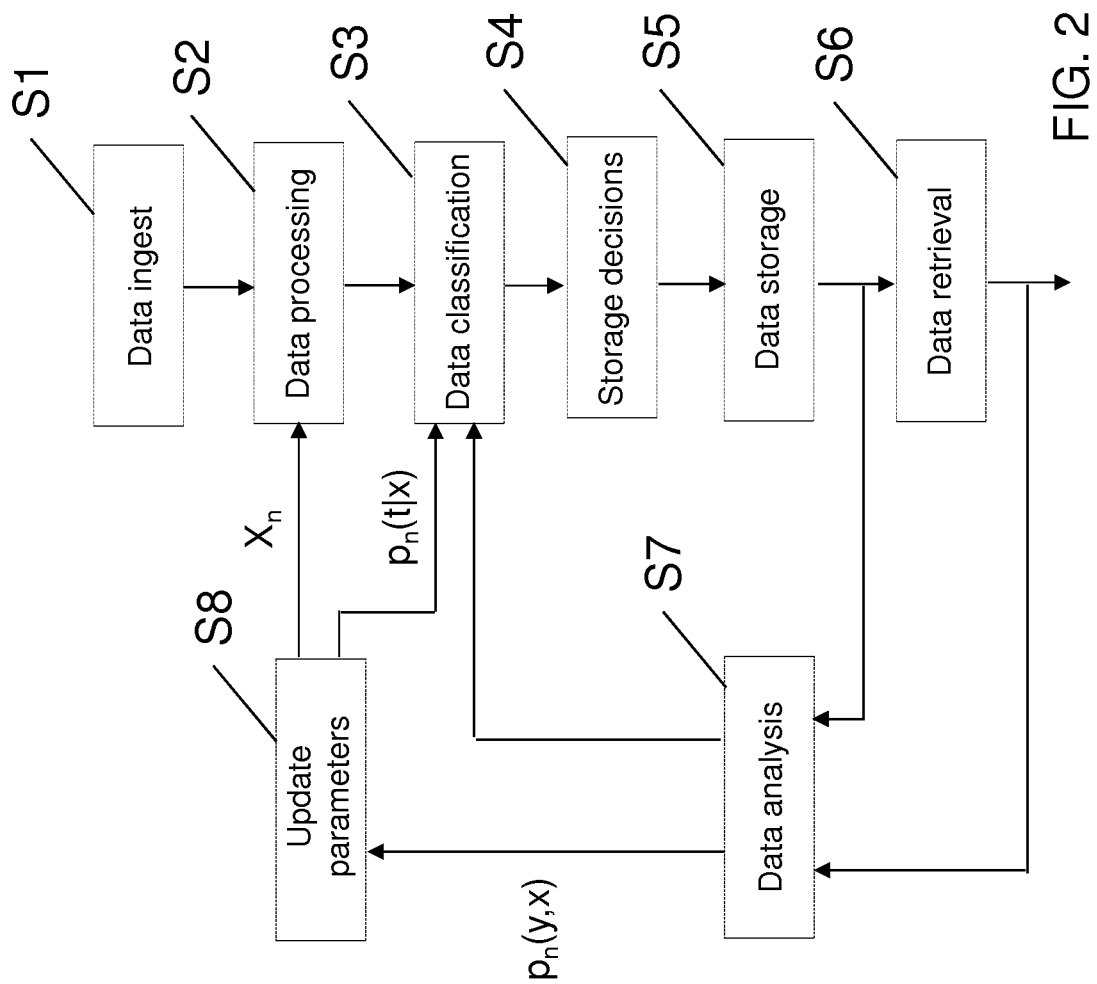
FIG. 2 is a flowchart of a method for storing a data segment in a storage tier of a storage unit comprising at least two storage tiers, according to an embodiment of the present invention.
Figure 3:
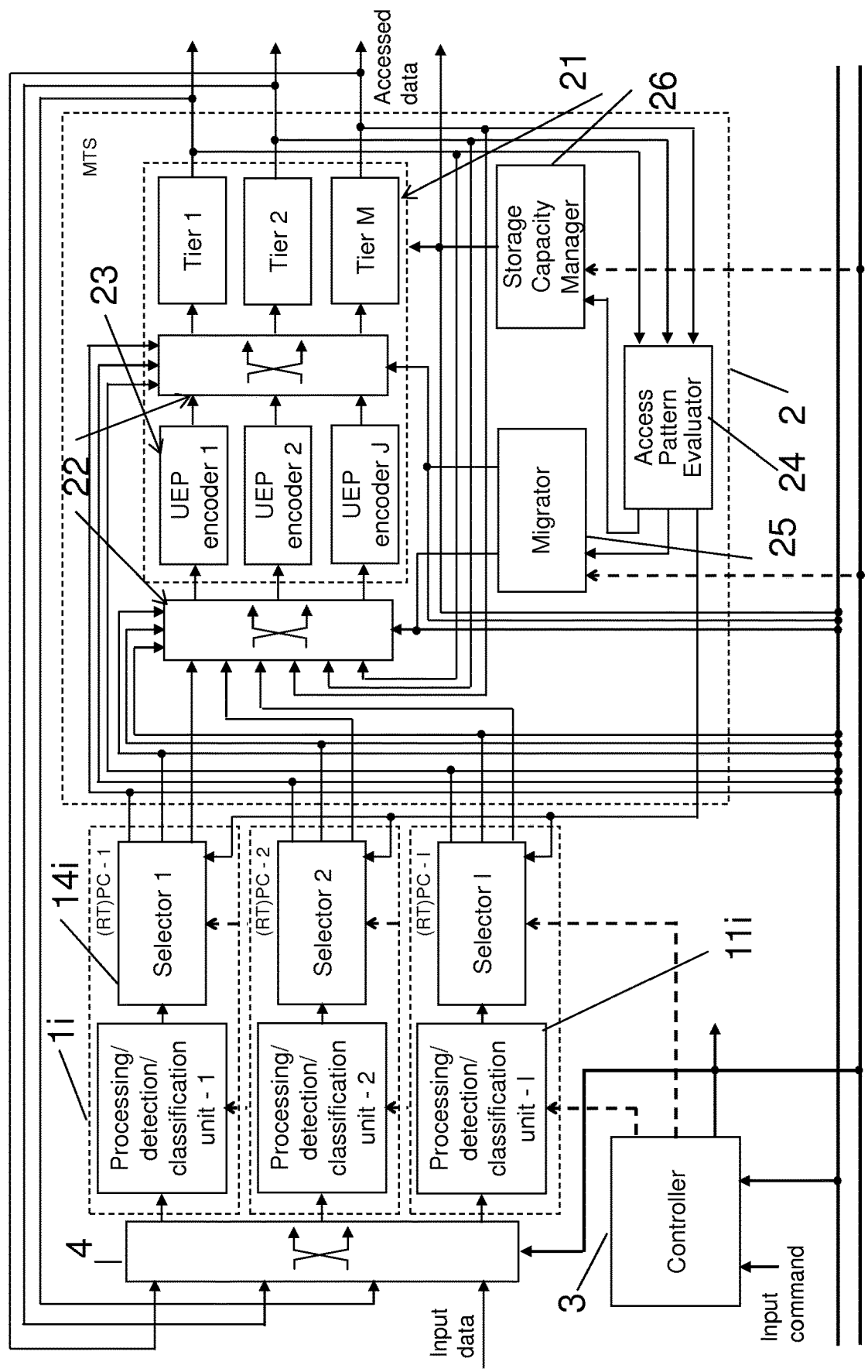
FIG. 3 is a block diagram of a storage system according to an embodiment of the present invention.

FIG. 2 illustrates a flowchart of a method for storing a data segment in a storage tier of a storage unit comprising at least two storage tiers, according to an embodiment of the present invention, and preferably in a storage system according to FIG. 1 or FIG. 3. In operation S1, a data segment is received for storage. In operation S2, the data segment is processed. This includes the determination of the value of an observable. In operation S3, the data segment is classified into a relevance class out of a set of relevance classes. This operation may preferably be performed by a classification unit 11 such as shown in any of the other FIGS. 1, 3 and 4. In operation S4, a storage tier and a protection level is determined for the data segment.

Figure 4:
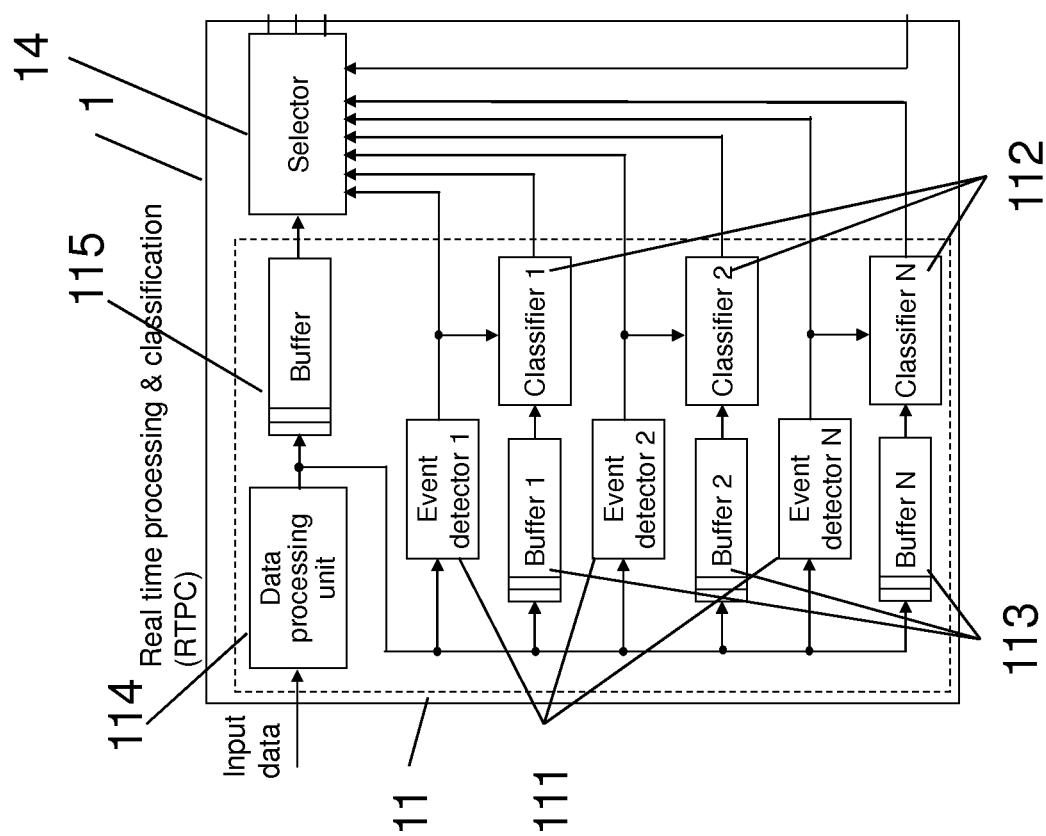
FIG. 4 is a block diagram of a processing unit, according to an embodiment of the present invention.

This operation may preferably be performed by a selector 14 such as shown in any of the other FIGS. 1, 3 and 4. In operation S5, the data segment is stored in the storage tier and at the protection level as defined in operation S4. Operation S6 indicates a data segment retrieval operation. The data stored and/or the data retrieved, and preferably a selection of the data stored and/or the data retrieved is selected as sampled data for a data analysis in operation S7. This operation may preferably be performed by the analytics engine shown in FIG. 1.

In the data analysis of operation S7, a joint probability is determined for an observable X and a topic Y in data segments stored or to be stored. This joint probability $p_n(y,x)$ at time n is supplied for updating parameters in operation S8, such as the observable $X_n$. Once the observable $X_n$ is updated/adapted, for any new data segment a value for the adapted observable is identified in operation S2.

In addition, in operation S8 a conditional probability $p_n(t|x)$ is determined for a relevance class t given the observable X. The conditional probabilities for the values of the observable may be applied to the selection and assignment of a relevance class in operation S3, wherein, for example, the information bottleneck algorithm may be applied, or any derivatives thereof.

In case a data segment stored or retrieved shall be re-classified, such data segment is forwarded to the data classification operation S3.

FIG. 3 illustrates a block diagram of a storage system according to another embodiment of the present invention. The storage system comprises I processing units 1, each processing unit 1*i* comprising a classification unit 11*i* also referred to as Processing/detection/classification unit, and a selector 14. The storage system further provides a storage unit 2 also referred to as Multi-Tier Storage (MTS) which may basically correspond to the storage unit 2 of FIG. 1.

A switch 4 distributes incoming data segments across the various processing units 1*i*, e.g., according to a present load the individual processing units 1*i* are exposed to. The incoming data segments may include new data segments to be stored ("Input data"), and may include data segments already stored in the storage unit, e.g., for re-classification purposes, or solely for extracting information such as metadata for analysis.

Hence, a scalable architecture of a storage system is suggested that processes incoming external data segments as well as reprocesses data segments retrieved from the MTS, and generates new data segments to be stored in the MTS. In the reprocessing case the reprocessing is typically done in non-real-time.

A more detailed scheme of an individual classification unit 11*i* such as used in any one of the processing units 1*i* of FIG. 3 is illustrated in FIG. 4.

In the classification unit 11, an incoming data stream containing data segments is elaborated by a real-time pre-processing unit 114, typically to perform one or more of filtering operations, suppression of spurious data segments, e.g., removing interference in the context of astronomical data application, ensuring privacy of medical records by pseudonymization in the context of cohort studies in the healthcare industry, or extracting relevant information from medical records in the context of personalized medicine. An output of the real-time processing unit 114 is presented to a set of N online event detectors 111. Each of the N event detectors 111 determines whether the occurrence of an event, which may be associated with predefined information, is detected within a segment of the incoming data stream. Each event detector 111 of the set may be configured to detect a specific event that is different from the events the other event detectors 111 of the set are expected to detect.

In general, real-time classification may refer to any initial data evaluation that may take place while guaranteeing a predetermined sustained rate of the incoming data stream. Whenever a relevant event is detected by one of the N event detectors, an associate online classifier 112 assigns the data segment, which contains the information related to the event, to one of K+1 relevance classes with K≥0 depending, e.g., on the presence or absence of features that characterize the event. Data segments, where event-related information is not detected, are assigned by default to a Class 0. Note that a set of N buffers 113 is included in the data paths to compensate for delays introduced by the associate event detector 111 and classifier 112. Also note that in a preferred embodiment, several pairs of event detectors 111 and classifiers 112 may be operating in parallel, if events of different nature are deemed relevant, as illustrated in FIG. 4 for N detector 111/classifier 112 pairs, with N=3. In this case, a data segment may be associated with multiple tags assigned by the various classifiers 112, and a buffer 116 in the main data path to the storage unit 2 preferably is dimensioned to accommodate a largest delay expected to be introduced by the classifiers.

In other embodiments, only the occurrence of a single event is desired to be detected, in which case the event detector at the same time acts as classifier—or the classifier acts as event detector. In a different embodiment, the occurrence of an event may be known a priori and only event features are desired to be identified, in which case the event detector/s 111 is/are not needed.

Returning to the block diagram of FIG. 3, a controller 3 is preferably included to perform one or more of the following functions:

control of the switch 4 directing the input data segments to the individual processing units 1*i*;

configure the I processing units 1, including event detector/classifier pairs if any as well as associated relevance classes;

configure the selectors 14*i* in the I processing units 1*i*, including parameters for storage tier placement, protection level and redundancy metric computation;

configure the data relocation manager 25 in the storage unit 2, if any, including parameters for a migration metric computation;

configure the storage capacity manager 26 in the storage unit 2, if any, including parameters for a retention metric computation.

Preferably, the functions performed by the controller 4 are based on external input commands from, e.g., an administrator, and on information from one or more of the following elements of the storage system:

initial placement of the data segments by the I selectors 14*i*;

migration of the data segments;

erasure or reduction of redundancy of the data segments;

requirements for increase in storage capacity in one or more of the storage tiers.

In a preferred embodiment, the storage system depicted in FIG. 3 can be seen as a subunit of a larger system comprising several subunits, and a global controller coordinating the activities of the controllers at the individual subunits, and accepting external input commands.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A device, comprising:
a processor communicatively coupled to a memory, the processor configured to:
receive a set of relevance classes for tagging data segments;
receive a first data segment including a first metadata to be stored in a storage unit, wherein the storage unit comprises at least two storage tiers;
wherein the first metadata comprises a set of variables;
wherein the set of variables includes a location of the first data segment in a directory structure, a group to which a user of the first data segment belongs, and at least one or more of: a user of the data segment, a size of the data segment, an access control list for the data segment, a time of generation of the data segment, a time of last modification of the data segment, a time of last access of the data segment, a name of the data segment, an indication of whether structured or unstructured data are contained in the data segment, and an indication of a required data retention time;
receive other metadata for other data segments stored in the storage unit;
determine an event associated with the first data segment, the event comprising an occurrence of one or more pre-defined events;
remove at least one relevance class from the set of relevance classes to create an adjusted set of relevance classes based on the event;

determine an observable comprising two or more variables of the set of variables for the first data segment;

determine, for each value of the observable, a distribution of stored data segments across the adjusted set of relevance classes utilizing an agglomerative information bottleneck algorithm;

assign a relevance class out of the adjusted set of relevance classes to the first data segment based on one or more results of the agglomerative information bottleneck algorithm;

determine a storage tier of the at least two storage tiers to store the first data segment based on the other metadata of the other data segments stored in the storage tier, the relevance class, the first metadata of the first data segment, and a content of the first data segment;

determine a protection level for the first data segment based on one or more of the first metadata of the first data segment, the other metadata of the other data segments stored in the storage unit, and the content of the first data segment; and storing the first data segment on the storage tier with the protection level, wherein the first data segment is encoded with the protection level by an encoder prior to being stored on the storage tier.

2. A non-transitory computer readable storage medium having computer readable instructions stored thereon that, when executed by a computer, implement a method comprising:

receiving a first data segment including metadata to be stored in a storage unit, wherein the storage unit comprises at least two storage tiers;

wherein the metadata of the first data segment comprises a set of variables;

wherein the set of variables includes a location of the first data segment in a directory structure, a group to which a user of the first data segment belongs, and at least one or more of:

a user of the data segment, a size of the data segment, an access control list for the data segment, a time of generation of the data segment, a time of last modification of the data segment, a time of last access of the data segment, a name of the data segment, an indication of whether structured or unstructured data are contained in the data segment, and an indication of a required data retention time;

receiving other metadata for other data segments stored in the storage unit;

determining an event associated with the first data segment, the event comprising an occurrence of one or more pre-defined events;

removing at least one relevance class from a set of relevance classes to create an adjusted set of relevance classes based on the event;

determining an observable comprising two or more variables of the set of variables for the first data segment;

determining, for each value of the observable, a distribution of stored data segments across the adjusted set of relevance classes utilizing an agglomerative information bottleneck algorithm;

assigning a relevance class out of the adjusted set of relevance classes to the first data segment based on one or more results of the agglomerative information bottleneck algorithm;

determining a storage tier of the at least two storage tiers to store the first data segment based on the other metadata of the other data segments stored in the storage tier, the relevance class, the first metadata of the first data segment, and a content of the first data segment;

determining a protection level to apply to the first data segment based on one or more of the first metadata of the first data segment, the other metadata of the other data segments stored in the storage unit, and the content of the received data segment; and storing the first data segment on the storage tier with the protection level, wherein the first data segment is encoded with the protection level by an encoder prior to being stored on the storage tier.

3. The storage medium of claim 2, wherein determining the storage tier and the protection level includes identifying a storage tier and a protection level at which a majority of data segments showing same or similar metadata as the first data segment is stored.

4. The storage medium of claim 2, wherein the method further comprises:

determining information about a frequency at which data segments stored in one or more of the at least two storage tiers are accessed;

determining the storage tier for storing the first data segment to be dependent on at least access frequency information received for data segments in the same relevance class;

determining a level of protection for the classified data segment dependent on at least the assigned relevance class; and storing the classified data segment including the assigned relevance class to the determined storage tier and according to the determined level of protection.

* * * * *